United States Patent
Pisharody et al.

(10) Patent No.: US 7,743,155 B2
(45) Date of Patent: Jun. 22, 2010

(54) ACTIVE-ACTIVE OPERATION FOR A CLUSTER OF SSL VIRTUAL PRIVATE NETWORK (VPN) DEVICES WITH LOAD DISTRIBUTION

(75) Inventors: Vinod Pisharody, San Jose, CA (US); Michael Wu, San Jose, CA (US); Tanya Zhiltsova, Morgan Hill, CA (US)

(73) Assignee: Array Networks, Inc., Milpitas, CA (US)

( * ) Notice: Subject to any disclaimer, the term of this patent is extended or adjusted under 35 U.S.C. 154(b) by 361 days.

(21) Appl. No.: 11/801,804

(22) Filed: May 10, 2007

(65) Prior Publication Data
US 2008/0263209 A1 Oct. 23, 2008

Related U.S. Application Data

(60) Provisional application No. 60/925,469, filed on Apr. 20, 2007.

(51) Int. Cl.
*G06F 15/16* (2006.01)
(52) U.S. Cl. .................. 709/227; 709/217
(58) Field of Classification Search .......... 709/217, 709/218, 219, 227, 228, 229
See application file for complete search history.

(56) References Cited

U.S. PATENT DOCUMENTS

2006/0190460 A1* 8/2006 Chandrasekaran et al. .. 707/100
2007/0198656 A1* 8/2007 Mazzaferri et al. .......... 709/218

* cited by examiner

*Primary Examiner*—Ramy M Osman
*Assistant Examiner*—Marshall McLeod
(74) *Attorney, Agent, or Firm*—Buchanan Ingersoll & Rooney PC

(57) ABSTRACT

A method of load distribution for a cluster of two or more nodes. The method comprises receiving an initial request packet on a network device having a virtual IP address; forwarding the request packet from the network device to a cluster of at least two nodes, wherein each of the at least two nodes has an internal dispatcher module and an unique and non-conflicting virtual IP address; establishing one of the at least two nodes as a priority dispatcher or dispatcher endpoint, wherein if any one node fails, the virtual IP address of the one node which is no longer active falls back to another node within the cluster based on cluster priorities; dispatching the request packet to one of the nodes associated with the cluster; and forwarding the request from one of the nodes to a switching device.

25 Claims, 4 Drawing Sheets

In the figure,
- V1' is virtual site V1's IP on Node 1
- V1'' is virtual site V1's IP on Node 2
- V1''' is virtual site V1's IP on Node 3
- V1', V1'' and V1''' are members of group G1
- "VIP V1" represents the dispatcher VIP for virtual site V1 and is attached to group G1

ACTIVE-ACTIVE OPERATION FOR A CLUSTER OF SSL VIRTUAL PRIVATE NETWORK (VPN) DEVICES WITH LOAD DISTRIBUTION

CROSS REFERENCE TO RELATED APPLICATION

This application claims priority to U.S. Provisional Application Ser. No. 60/925,469, filed Apr. 20, 2007, which is incorporated herein in its entirety.

FIELD OF THE INVENTION

This invention generally relates to a system and method of load distribution, and more particularly to a system and method of load distribution having an active-active operation for a cluster of SSL virtual private network ("VPN") devices, wherein the load distribution is performed by the SSL virtual private network (VPN) devices within the cluster.

BACKGROUND

One of the most utilized networks for interconnecting distributed computer systems is the Internet. The Internet allows users of computer systems to exchange data throughout the world. In addition, many private networks in the form of corporate or commercial networks are connected to the Internet. These private networks are typically referred to as an "intranet." To facilitate data exchange, the intranet generally uses the same communications protocols as the Internet. These Internet protocols (IP) dictate how data is formatted and communicated. In addition, access to corporate networks or intranets can be controlled by network gateways, which can include a firewall system.

As the popularity of the Internet grew, businesses turned to it as a means of extending their own networks. First came the intranet, which was an access-controlled site designed for use only by company employees. Now, many companies are creating their own VPN (virtual private network) to accommodate the needs of remote employees and distant offices. An SSL VPN is generally a private network that uses SSL technology over a public network (usually the Internet) to connect remote sites or users together. Instead of using a dedicated, real-world connection such as a leased line, an SSL VPN uses "virtual connections" routed through the Internet and cryptographically protected by SSL from the company's private network to the remote site or employee.

It can be appreciated that a load balancer can be used to increase the capacity of a network (or node), which is typically includes a collection of servers usually maintained by an enterprise to accomplish server needs far beyond the capability of one machine. For example, often, a network comprised of a plurality of servers will have both a primary and a backup server allocated to a single task, so that in the event of the failure of the primary server, a backup server will take over the primary server's function. In addition, it can be appreciated that load balancing can also be important so that no single device or node is overwhelmed.

A load balancer can also allow the service to continue even in the face of server down time due to server failure or server maintenance. Typically, a load balancer consists of a virtual server, which, in turn, consists of an IP address and port. The virtual server is bound to a number of physical services running on the physical servers in a server farm. These physical services contain the physical server's IP address and port. A client sends a request to the virtual server, which in turn selects a physical server in the server farm and directs this request to the selected physical server. Load balancers are sometimes referred to as "directors" or "dispatcher", which reflects the load balancer's role in managing connections between clients and servers.

In a cluster of SSL VPN devices or gateways, it would be desirable to enable configurations of a cluster of two or more nodes in the form of SSL VPN devices or gateways, which act as a single entity to provide high availability and scaleable performance without the use of an external load balancer and/or dispatcher.

SUMMARY OF THE INVENTION

In accordance with one embodiment, a method of load distribution for a cluster of two or more nodes comprises: receiving an initial request from a network device to a cluster of at least two nodes, wherein each of the at least two nodes has a dispatcher module (which instantiates one dispatcher endpoint per group of virtual sites) and a unique and non-conflicting IP addresses for all virtual sites; establishing one of the at least two nodes as a priority dispatcher; dispatching the request packet to one of the nodes associated with the cluster; processing the request on one of the nodes associated with the cluster, and forwarding the request to a switching device. For a group of virtual sites comprised of a plurality of clusters of at least two nodes, each group of virtual sites is represented by a dispatcher, and wherein each dispatcher has its IP clustered such that only one dispatcher is active at a time for each group of virtual sites.

In accordance with another embodiment, a method of load distribution for a cluster of two or more nodes comprises: receiving an initial request packet on a network device having a virtual IP address; forwarding the request packet from the network device to a cluster of at least two nodes, wherein each of the at least two nodes has a dispatcher module including at least one dispatcher endpoint per group of virtual sites and unique and non-conflicting IP addresses for all virtual sites (groups of which on different nodes are represented by a dispatcher); establishing one of the at least two nodes as a priority dispatcher, wherein if any one node fails, the virtual IP address of the one node which is no longer active falls back to another node within the cluster based on cluster priorities; dispatching the request packet to one of the nodes associated with the cluster; and processing the request on one of the nodes associated with the cluster and possibly forwarding the request to a switching device.

BRIEF DESCRIPTION OF THE DRAWINGS

The invention will now be described in greater detail with reference to the preferred embodiments illustrated in the accompanying drawings, in which like elements bear like reference numbers, and wherein.

DETAILED DESCRIPTION

Figure 1:
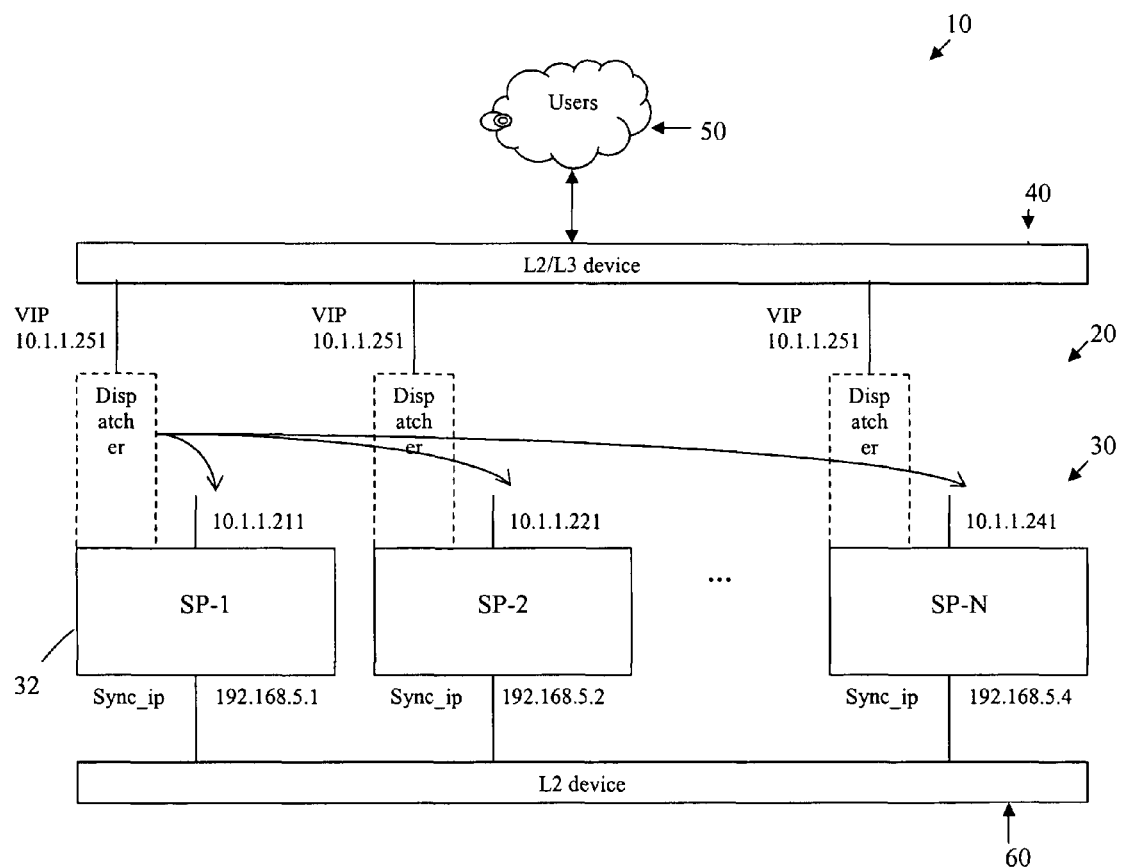
FIG. 1 is a schematic diagram of a system having an Active-Active Setup having an internal load balancer/dispatcher in accordance with one embodiment.

It can be appreciated that today, many industries and enterprises are looking to simplify and optimize their business operations by increasing employee productivity and business agility while streamlining network management and delivering dramatic cost savings. In order to provide a secure, on-demand access both internally and remotely, virtual private network (VPN) devices (aka gateways) can connect employees with remote applications and information (i.e., resources/services) need to meet the demands of customers, from small, local businesses to large, global enterprises and from financial services and healthcare to government and education. For example, secure access to applications and web-enabled content can be utilized by almost all types of businesses from delivering fast, secure access to administrative and clinical applications and patient records in the healthcare industry, improving customer serving service and services while reducing costs for a financial institution, generating optimum productivity from supply chains and employees for retailers, enabling fast, secure access to administrative and educational applications; providing fast access and iron-clad security for vital operations and data for governmental entities; and the ability to offer fast and secure access and e-mail services, optimum availability and security with streamlined management over the internet.

Web-enabled applications help integrate company systems so they share information and connect employees, suppliers, and administrators to automated business processes. Regardless whether the Internet is being used for financial, supply chain, customer relationship management, or other business critical applications, the essential requirements remain the same: without the appropriate level of performance, availability, and security, applications cannot deliver on promised returns. Moreover, as client and client devices demand greater access to data and services via Web-based or enabled programs, the need for performance, availability, and security enhancing products and solutions has never been greater.

It can be appreciated that the exchange of data between nodes or clusters of a network system, can be between a client or client machine such as a computing device (e.g., a computer, PDA, cell phone, any devices with an embedded CPU/software) and/or another node or cluster, which can include application running on a computing device, and a set of resources (files, services, devices, etc.), which can be identified with an individual name and/or IP address and port number. Each of the nodes preferably includes information of a sensitive nature containing, for instance, confidential data on finances, business development plans, or private e-mail.

In order to provide a secure connection between a first node (i.e., a client) and a second node (i.e., a server), a tunnel is established, over a communication network 50 such as Internet, between the first node and the second node using a tunneling protocol, which encapsulates one protocol or session inside another. The tunneling protocol preferably includes a suitable protocol, wherein the transmission of data intended for use only within a private, usually corporate network through a public network in such a way that the routing nodes in the public network are unaware that the transmission is part of a private network. It can be appreciated that the tunneling is preferably performed by encapsulating the private network data and protocol information within the public network transmission units so that the private network protocol information appears to the public network as data. The tunnel is preferably formed using a secure protocol, such as SSL (secure sockets layer) or TLS (transport layer security), which provide secure communications on the Internet for such things as e-mail, Internet faxing, and other data transfers. SSL provides endpoint authentication and communications privacy over the Internet using cryptography.

In accordance with one embodiment, it would be desirable to have an integrated load balancer and an active-active operation in a cluster 20 (or network) of two more nodes 30, which are preferably SSL VPN devices or gateways, such that the load distribution is performed by the cluster 20 of nodes 30 (VPN devices or gateways) within the cluster 20. In accordance with one embodiment, the cluster 20 is considered up and alive as long as at least one node 30 (VPN device or gateway) belonging to that cluster 20 is operational.

In addition, it would be desirable for the system 10 comprised of a cluster 20 of two or more nodes 30 in the form of SSL VPN devices or gateways to support "Stateful Session Failover" (SSF) in both an Active-Active (AA) and/or an Active-Standby (AS) mode. It can be appreciated that in an Active-Active (AA) or an Active-Standby (AS) mode, each mode has a failover configuration, which implements its own method to determine and perform failover. With an Active-Active (AA) mode, each of the nodes 30 (SSL VPN devices or gateways) can pass network traffic, which allows load balancing on the network. Meanwhile, with an Active-Standby mode, only one node 30 (SSL VPN device or gateway) passes traffic while the other nodes 30 (SSL VPN devices or gateways) wait in a standby state. It would be desirable to have a system having a "Stateful Session Failover" (SSF), which feature enables configuration of a cluster of two or more nodes 30 (SSL VPN devices or gateways) acting as a single entity to provide high availability (HA) and scalable performance. It can be appreciated that a system with High Availability (HA) can ensure a certain absolute degree of operational continuity during a given measurement period, wherein availability refers to the ability of the user community to access the system, whether to submit new work, update or alter existing work, or collect the results of previous work. For example, if a user cannot access the system 10, it is said to be unavailable. Generally, the term downtime is used to refer to periods when a system 10 is unavailable.

In both AA and AS modes, once a user (client) is authenticated, the user will preferably not be prompted for SSL VPN device or gateway credentials when one or more cluster nodes 30 fails and/or rejoins the cluster dynamically. In accordance with one embodiment, each of the nodes 30 within the cluster 20 is identically configured and synchronized (e.g., using boot-time and run-time synconfig). In addition, each of the nodes 30 of the cluster 20 is preferably configured to handle user requests actively to improve the overall application throughput. It can be appreciated that the load balancing/dispatching of user requests can be preformed by an internal load balancing/dispatcher module or by an external load balancer. The selection of the preferred mode of clustering is preferably selected based on scalable application throughput or performance and high availability (HA).

FIG. 1 shows a schematic diagram of a system 10 comprised of a cluster 20 of nodes 30 in the form of virtual private network (VPN) devices or gateways having an internal load balancer/dispatcher in accordance with a first embodiment having an Active-Active setup. As shown in FIG. 1, the system 10 includes a configuration of at least two nodes 30 in the form of virtual private network (VPN) devices or gateways (or units), wherein each of the VPN devices or gateways are replicated with identical configuration for the virtual services. It can be appreciated that in accordance with one embodiment, the VPN devices or gateways are preferably SSL VPN devices. However, it can be appreciated that VPN devices or gateways can be based on any suitable VPN technology including IPsec (IP security)—commonly used over IPv4, and an obligatory part of IPv6, PPTP (Point-to-Point Tunneling Protocol), L2TP (Layer 2 Tunneling Protocol), L2TPv3 (Layer 2 Tunneling Protocol version 3), and VPN Quarantine. The system 10 also includes an L2/L3 network device 40, which preferably functions as both a (L2) switching or bridging device and a (L3) router. For example, in accordance with one embodiment, the L2/L3 network device 40 is configured such that the device 40 can both bridge Ethernet frames between its interfaces as well as route IP traffic and participate in IP routing protocols to the cluster 20 of the VPN devices or gateways.

In accordance with one embodiment, the identical virtual services hosted by each of the nodes 30 of the cluster 20 preferably have unique non-conflicting IP addresses. Each of the nodes 30 (VPN devices of gateways) having a unique non-conflicting IP addresses (of which one is used for synchronization) is preferably connected to a switching or bridging device 60 (i.e., common broadcasting domain). The switching or bridging device 60 can be any suitable device that functions as a Layer 2 device (a.k.a. "switch", "bridge", "hub", etc). For each group of the identical virtual services (hosted on individual cluster units), a dispatcher virtual LP address (VIP) tied to a cluster group (so that this cluster group represents a set of equivalent virtual sites serving the same purpose but hosted on multiple nodes) is configured on each node 30 which represents the entire group of internal virtual services. In a non-active-active environment, different virtual sites/services on a node will serve different purposes. In an active-active environment, different virtual sites/services on a node will each be part of an equivalent group of virtual sites/services where each group serves the purpose of what one virtual site/service used to serve when not in an active-active configuration. Each of these groups of virtual sites/services will have an associated dispatcher to distribute load among members of the group. When the cluster 20 is started all internal virtual services on all nodes 30 are preferably equally active and ready to serve incoming requests. Based on dispatcher VIP's cluster priority, one of the nodes 30 (VPN devices or gateways) is designated as a priority dispatcher VIP 32. The priority dispatcher VIP 32 is configured to receive all the requests (TCP connections) and sends it to any one of the internal services of the group that is being associated with the dispatcher VIP 32. When a new user is authenticated and a session is created and/or updated in one node 30, the node 30 updates other nodes 30 and session table in all nodes 30 are synchronized. Session synchronization can be performed using an LP on the device designated as the synchronization IP (sync_ip).

In accordance with one embodiment, if any one node 30 fails, the node is marked unhealthy on all other nodes. As a result, dispatchers in the cluster will not send any more traffic to VIPs hosted on that node. If the dispatcher itself were active on the node that failed, cluster priorities would determine the node in the cluster that takes over the duties of the dispatcher. It can be appreciated that the priority dispatcher VIP 32 (failover or fall-back) only dispatches requests (splice tcp connection) to only active internal services associated with the VIP. Alternatively, if the priority dispatcher VIP 32 falls into a failover mode, the cluster's policy designates another one of the nodes 30 (VPN devices or gateways) as the priority dispatcher VIP 32.

Figure 2:
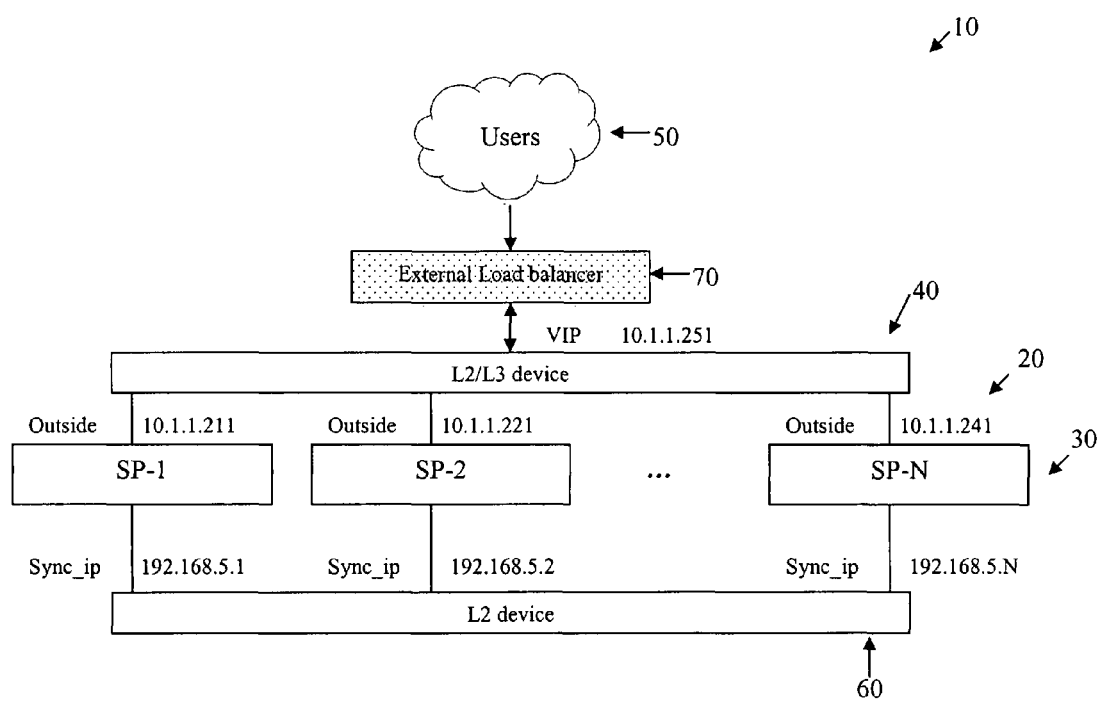
FIG. 2 is a schematic diagram of a system having an external load balancer in accordance with another embodiment.

FIG. 2 is a schematic diagram of a system 10 having an external load balancer 70 in accordance with another embodiment. As shown in FIG. 2, the system 10 is comprised of a cluster 20 of at least two nodes 30 (VPN devices or gateways), wherein each of the nodes 30 (VPN devices or gateways) is replicated with identical configuration for the virtual services associated therewith. In accordance with one embodiment, the identical virtual services hosted by all cluster nodes preferably have unique non-conflicting IP addresses. The interface where the synchronization IP (unique/non-conflicting) is configured for each of the nodes 30 (VPN devices or gateways) is preferably connected to a switching or bridging device (common broadcasting domain) 60. The external load balancer 70 is configured for the virtual IP addresses (VIPs) and their associated backend virtual services IPs. When the cluster 20 is started all nodes 30 (VPN devices or gateways) are equally active and ready to serve incoming requests. When a new user is authenticated and a session is created and/or updated in one node 30, the node 30 updates other nodes 30 and session table in all nodes 30 which are synchronized. Session synchronization is performed using an IP on the device designated as the synchronization IP (sync_ip).

In accordance with one embodiment, the external load balancer 70 may monitor the health of each virtual service on each of the individual cluster nodes and if a service is down, the external load balancer 70 can distribute the load among the remaining active services, which includes receiving test pages from the nodes, doing pings or checking for links, etc. It can be appreciated that the utilization of an external load balancer 70 may be preferred in certain systems 10 as a result of the simple configuration, and improved performance for additional nodes 30 (VPN devices or gateways) that are added to the system 10.

Figure 3:
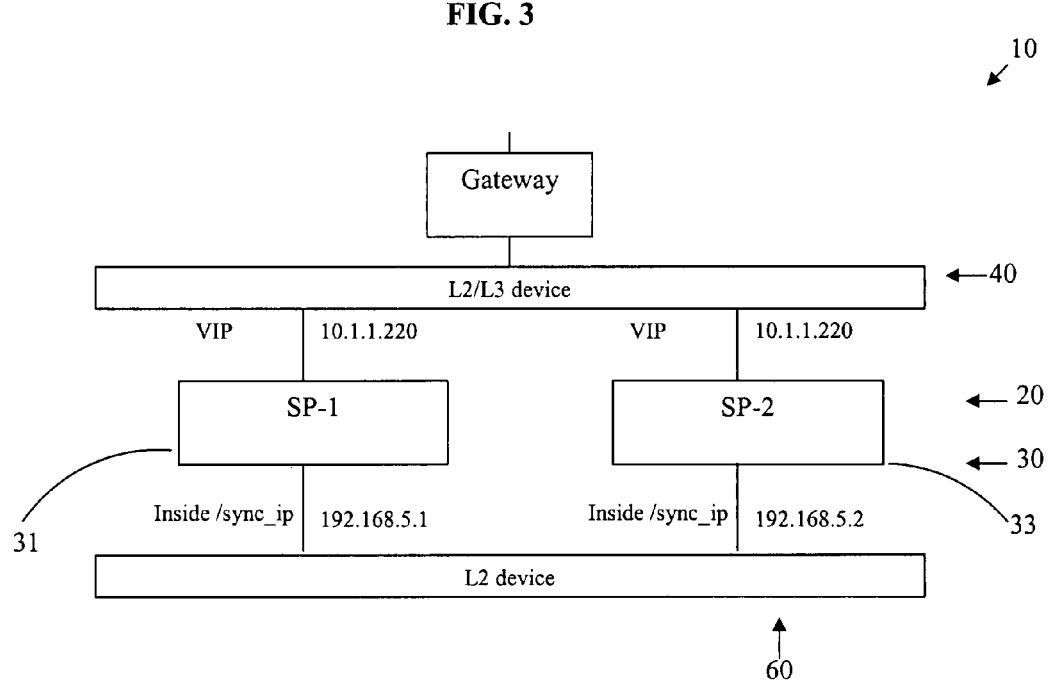
FIG. 3 is a schematic diagram of a system having an Active-Standby Setup in accordance with a further embodiment.

FIG. 3 is a schematic diagram of a system 10 having an Active-Standby Setup (or an active-standby cluster) in accordance with a further embodiment. The Active-Standby Setup may be selected over other configurations when high availability (HA) is a primary requirement (as opposed to performance). As shown in FIG. 3, in this embodiment, the mode of configuration requires a cluster 20 of at least two nodes 30 (VPN devices or gateways) replicated with identical configuration (syn-configed) for the virtual services. The outside facing interfaces of each of the nodes 30 (or units) have the same set of IP addresses for identical virtual services and may be connected to a networking device 40 (i.e., an L2/L3 network device).

The interface where IP designated for synchronization (unique/non-conflicting) is configured of all the nodes 30 (VPN devices or gateways or units) must be connected to a switching or bridging device 60 (i.e., a L2 device or common broadcasting domain). When the cluster 20 is started one of the nodes 30 (VPN device or gateway) acts as an active unit 31 and a passive unit 33, wherein the passive unit's VIP interfaces are down. The active unit 31 synchronizes the session tables with the passive unit 33 using the IP and interface designated for synchronization. In case the active unit 31 fails one of the passive units 33 based on priority takes over the role of the active unit 31 by enabling the VIP interfaces.

It can be appreciated that each of the modes as shown in FIGS. 1-3, will experience similar network setup for a new node 30 (VPN device or gateway) joining the network or cluster 20. It can be appreciated that when a node 30 (VPN device or gateway) is booted back it queries other existing nodes for the existing user sessions and pull the session tables from the existing nodes 30 (VPN device or gateways). It can be appreciated that the pulling up of existing sessions from other active clusters 20 (or cluster nodes) may take a variable amount of time depending on the number of user sessions present on other active cluster 20 (or cluster nodes). As soon as the new node synchronizes itself with others it is ready to backup other VPN device or gateways 30 (nodes). It can be appreciated that the new nodes 30 (VPN device or gateways) start participating in clustering as soon as the node 30 (VPN device or gateway) joins the cluster (i.e., is booted up) and thus serving requests for any session created after the node 30 (VPN device or gateway) joins the cluster 20 (i.e., boots up).

It can be appreciated that in accordance with one embodiment, once a user is authenticated and as long as at least one cluster node 30 is active, the user will experience uninterrupted URL browsing and web link access. It can be appreciated that in certain limited circumstances, such as long file transfers, if the underlying node 30 engaged with the current file transfer fails, the user may see an error page/message indicating that the server is down, and the user may have to retry the file transfer operation. However, it can be appreciated that generally, once a user is authenticated and as long as there is at least one cluster node, which is active, the user will experience uninterrupted backend web-server page access.

In accordance with one embodiment, if the underlying node engaged with an access mode of the SSL VPN, such as a L3VPN (Layer 3 Virtual Private Network) session fails, the L3VPN will try to reconnect, it can be appreciated that it may take some time (e.g., a few seconds to minutes) before L3VPN client reconnects successfully to the failed over node, during the reconnect time duration user applications may behave slight jittery. However, it can be appreciated that a user who has passed Client Security and successfully logged into a node 30 (VPN device or gateway) in the cluster 20 should not experience any interruption of the session, nor will the user be prompted to authenticate with the node 30 (VPN device or gateway). It can be appreciated that L3VPN is one of six (6) access modes of an SSL VPN device, which can also include WRM (web access), TCS (application specific layer 4 access), ClientApp (generic layer 4 access), WinRedir (web specific layer 4 access), and Mailproxy (for SMTP and IMAP services).

It can be appreciated that the method and system can provide for Stateful Session Failover (SSF), wherein the major components of a Stateful Session Failover, which include runtime synchronization, dispatcher, health check, IP (Internet Protocol) failover, and application reconnect are incorporated into the system.

Runtime synchronization deals with node advertisement and discovery, node (VPN device or gateway) Session synchronizations, other runtime info synchronizations, and the ability to provide a communication infrastructure between cluster nodes, which can be used for example for Command Line Interface (CLI) synchronization or for any kind of synchronization, which is required.

In accordance with one embodiment, the dispatch module (or dispatcher) is a TCP based load balancer, which enables creating Active-Active cluster of two or more nodes without requiring an external load balancer. The dispatcher can be set to operate in a Persistent IP or Round Robin mode. However, it can be appreciated that in addition to Persistent IP or Round Robin, other load balancing mechanisms can also be used. In accordance with one embodiment, the "PIP" is preferably the default mode of operation. However, it can be appreciated that either PIP (Persistent IP) and/or RR (Round Robin) can be implemented as the default mode of operation. It can be appreciated that in the "PIP" mode, requests from a fixed source IP is always being served by fixed cluster node hosting the active-active real service. Meanwhile, in the "RR" mode requests to a virtual service are dispatched to active-active real services hosted on all the cluster nodes in round-robin fashion.

It can be appreciated that a Stateful Failover can occur under when an administrator halts and reboots one of the nodes 30 of the cluster 20, and/or one of the nodes 30 of the cluster 20 crash and reboots automatically. In addition to the above situations or cases there is the third way of forcing failover to happen, which is by self monitoring of health (i.e., Health Check) of a node 30. In accordance with one embodiment, the Health Check (HC) is a user level daemon, which applies certain heuristics to decide if the node 30 needs to be marked down so that subsequent user requests failover to other healthy nodes.

Node discovery and advertisement can also be configured such that the Stateful Session Failover (SSF) system can include user-configured parameters such as Cluster ID to discover nodes 30, which belong to the same cluster 20. It can be appreciated that nodes 30 belonging to a cluster 20 will share the same cluster ID and use an encrypted synchronization data. This set of parameters enables multiple clusters to be present in the same network (LAN). Also by data encryption the data exchanged between clusters nodes are protected from eavesdropping. In addition to these common parameters each node is configured with an IP (known as sync IP), subnet mask and Port. Sync IP and TCP port can be used to listen for incoming TCP connection request from member cluster nodes.

In accordance with one embodiment, the dispatcher 32 is preferably a local balancer operating at the TCP layer, and wherein the dispatcher 32 works on the following components: a dispatch Internet Protocol address (IP) to receive requests, a dispatch group that is paired with every dispatch Internet Protocol address (IP), and dispatch node Internet Protocol addresses (IPs) that are associated with a dispatch group. The dispatch Internet address (IP) is preferably an Internet Protocol address (IP) that represents a virtual site in a cluster. The Internet Protocol address (IP) fronts the set of real virtual site Internet Protocol addresses (IPs). The Internet Protocol address (IP) can be clustered using a virtual clustering protocol and hence, only one active instance of it will exist in the cluster. In addition, it can be appreciated that the machine (i.e., node) that has the active instance will be the dispatcher 32 for that virtual site in the cluster 20. The dispatch Internet Protocol address (IP) can be created by any suitable virtual clustering system, wherein the listening endpoints (port on which clicktcp listens for requests) can be created using the dispatcher CLI. In accordance with one embodiment, a dispatch group is the set of Internet Protocol addresses (IPs) that represent a virtual site in a cluster 20. A dispatch node represents a VPN device or gateway. Hence, each node can have up to 255 virtual site Internet Protocol addresses (IPs). In addition, each of the Internet Protocol address (IPs), in combination with the node id is an element that forms a group member.

Figure 4:
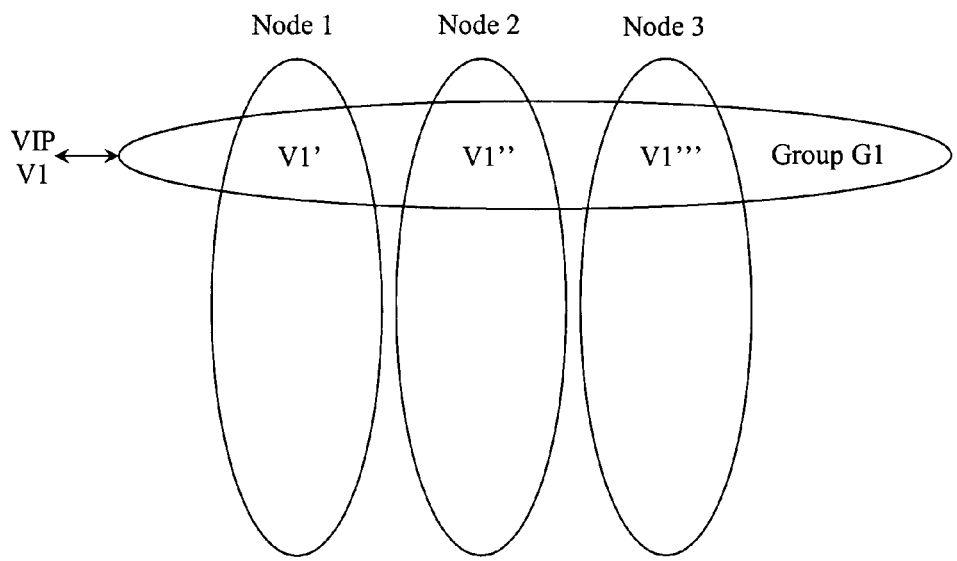
FIG. 4 is schematic diagram showing the relationship between a dispatcher IP, a group and a node.

The relationship between a dispatcher IP, group and node is shown in FIG. 4, wherein:

V1' is virtual site V1's IP on Node 1
V1" is virtual site V1's IP on Node 2
V1'" is virtual site V1's IP on Node 3
V1', V1" and V1'" are members of group G1
"VIP V1" represents the dispatcher VIP for virtual site V1 and is attached to group G1

As set forth above, the dispatcher allows the use of a Round-Robin (rr) or Persistent IP (pip) policy to pick the next node IP to direct an incoming connection. Once a connection is established, all data on that connection is sent to the same node 30.

In accordance with one embodiment, the dispatcher 32 accesses the next element in a list of IPs (belonging to a group). If this element is marked "UP" by health check (meaning, it is available for dispatch), this Internet Protocol address (IP) can be used. Alternatively, if this element is marked "DOWN", the next element in the list is examined. The process continues until the end of the list is reached, wherein the dispatcher starts again at the first element. If the dispatcher has already traversed the entire list and does not find any element available for dispatch (i.e. no element in a group that were marked up by health check), the dispatcher 32 rejects the incoming connection.

It can be appreciated that the determination of the element (virtual site IP) of a group that an incoming connection will be sent to is based on the source IP. If this element is not marked "UP" by healthcheck, the next element is not marked "UP" by healthcheck, the next element in the list will be picked. If the end of the list (of IPs in a group) is reached, the search is restarted from the start of the list. If, when searching for the next available Internet Protocol address (IP), the entire list is traversed once without finding an element marked "UP", the dispatcher rejects the incoming connection.

Alternative embodiments of the invention also may be implemented as a computer program product for use with a computer system or computer network. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method of load distribution for a cluster of two or more virtual private network devices comprising:
    receiving an initial request from a network device;
    forwarding the request from the network device to a cluster of at least two virtual private network devices, the cluster of at least two virtual private network devices having a virtual IP address, and wherein each of the at least two virtual private network devices has a dispatcher module and a unique and non-conflicting IP address;
    establishing one of the dispatch modules on the at least two virtual private network devices as a priority dispatcher, and wherein the priority dispatcher distributes load among the cluster of at least two virtual private network devices;
    dispatching the request to one of the virtual private network devices associated with the cluster;
    processing the request on one of the virtual private network devices associated with the cluster;
    forwarding the request to a switching device or bridging device, which forwards the request to a secure remote private network associated with the at least two virtual private network devices;
    synchronizing each of the virtual private network devices, using an IP and interface designated for synchronization and wherein for each group of the identical virtual services (hosted on individual cluster units), a dispatcher virtual IP address (VIP) tied to a cluster group is configured on each virtual private network device, which represents the entire group of internal virtual services;
    when a new user is authenticated and a session is created and/or updated in one virtual private network device, the virtual private network device updates other virtual private network devices and synchronizes session tables in all virtual private network devices; and
    wherein the dispatcher module is a TCP (Transmission Control Protocol) based load balancer, which enables creating an active-active cluster of two or more virtual private network devices without requiring an external load balancer.

2. The method of claim 1, further comprising a group of virtual sites comprised of a plurality of clusters of at least two virtual private network devices, wherein each group of virtual sites are represented by a dispatcher, and wherein each dispatcher having its IP clustered such that only one dispatcher is active at a time for each group of virtual sites.

3. The method of claim 2, wherein each dispatcher module instantiates one dispatcher endpoint per group of virtual sites.

4. The method of claim 1, wherein if the priority dispatcher is no longer active, another one of the at least two virtual private network devices becomes the priority dispatcher.

5. The method of claim 1, wherein each of the at least two virtual private network devices have identical configurations for virtual services.

6. The method of claim 1, wherein each of the at least two virtual private network devices are equally active.

7. The method of claim 1, wherein the at least two virtual private network devices comprise at least two SSL VPN devices or gateways, and wherein each of the at least two SSL VPN devices or gateways are replicated with identical configuration for the virtual services.

8. The method of claim 1, wherein the switching device is a common broadcast domain device.

9. The method of claim 1, wherein the network device functions as both a switching device and a router.

10. The method of claim 1, wherein the dispatcher module is a TCP (Transmission Control Protocol) based load balancer, which enables creating an active-active cluster of two or more virtual private network devices without requiring an external load balancer.

11. The method of claim 1, wherein the dispatcher module operates in a persistent IP mode or a round robin mode.

12. The method of claim 11, wherein the persistent IP mode is the default mode of operation, and the persistent IP mode request from a fixed source IP, which is served by a fixed cluster node hosting the active-active real service.

13. The method of claim 11, wherein the round robin mode request to a virtual service are dispatched to active-active real services hosted on all the cluster nodes in round robin fashion.

14. The method of claim 1, further comprising inducing a failover occurs under one or more of the following situations, administrator halts and/or reboots one of the cluster node, cluster node crashes and/or reboots automatically, or self-monitoring of health of the node.

15. The method of claim 1, wherein the cluster of at least two virtual private network devices act as a single entity.

16. The method of claim 1, wherein the cluster of at least two virtual private network devices is considered "UP" and "Alive" as long as at least one virtual private network device belonging to the cluster is operational.

17. The method of claim 1, wherein once a user is authenticated, the user is not prompted for credential when one or more of the at least two virtual private network devices fails and/or rejoins the cluster dynamically.

18. The method of claim 1, wherein in a non-active-active environment, different virtual sites and/or services on a virtual private network devices will serve different purposes.

19. The method of claim 1, wherein in an active-active environment, different virtual sites/services on a node will each be part of an equivalent group of virtual sites and/or services where each group serves the purpose of what one virtual sites and/or services used to serve when not in an active-active configuration.

20. The method of claim 1, wherein for each of these groups of virtual sites and/or services, each virtual site and/or service will have an associated dispatcher to distribute load among members of the group.

21. The method of claim 1, wherein the network device has a network bridging function and an IP routing function.

22. The method of claim 1, further comprising a fall-back dispatcher virtual IP address (VIP), and wherein the fall-back dispatcher virtual IP address (VIP) only dispatches requests to only active internal services associated with the virtual IP address (VIP).

23. A method of load distribution for a cluster of two or more nodes comprises: receiving an initial request packet on a network device;
    forwarding the request packet from the network device to a cluster of at least two virtual private network devices, the cluster of at least two virtual private network devices having a virtual IP address, and wherein each of the at least two virtual private network devices has a dispatcher module including at least one dispatcher endpoint per group of virtual sites and unique and non-conflicting IP addresses for all virtual sites;
    establishing one of the at least two virtual private network devices as a priority dispatcher, and wherein the priority dispatcher distributes load among the cluster of at least two virtual private network devices, and wherein if any one virtual private network device fails, the virtual IP address of the cluster of virtual private network devices falls back to another virtual private network device within the cluster based on cluster priorities;
    dispatching the request packet to one of the virtual private network devices associated with the cluster;
    processing the request on one of the virtual private network devices associated with the cluster;
    synchronizing each of the virtual private network devices, using an IP and interface designated for synchronization and wherein for each group of the identical virtual services (hosted on individual cluster units), a dispatcher virtual IP address (VIP) tied to a cluster group is configured on each virtual private network device, which represents the entire group of internal virtual services;
    when a new user is authenticated and a session is created and/or updated in one virtual private network device, the virtual private network device us dates other virtual private network devices, and synchronizes session tables in all virtual private network devices; and
    wherein the dispatcher module is a TCP (Transmission Control Protocol) based load balancer, which enables creating an active-active cluster of two or more virtual private network devices without requiring an external load balancer.

24. The method of claim 23, further comprising a group of virtual sites comprised of a plurality of clusters of at least two virtual private network devices, wherein each group of virtual sites are represented by a dispatcher, and wherein each dispatcher having its IP clustered such that only one dispatcher is active at a time for each group of virtual sites 25. The method of claim 23, further comprising forwarding the request to a switching device.

* * * * *